(12) United States Patent
Kogure et al.

(10) Patent No.: US 7,741,743 B2
(45) Date of Patent: Jun. 22, 2010

(54) FEEDER LINE DRAWING STRUCTURE OF MOTOR FOR SHIP PROPELLER

(75) Inventors: Akihiro Kogure, Tochigi (JP); Akira Fujisaki, Tochigi (JP)

(73) Assignee: Showa Corporation, Saitama (JP)

( * ) Notice: Subject to any disclaimer, the term of this patent is extended or adjusted under 35 U.S.C. 154(b) by 0 days.

(21) Appl. No.: 12/215,283

(22) Filed: Jun. 26, 2008

(65) Prior Publication Data
US 2009/0108687 A1  Apr. 30, 2009

(30) Foreign Application Priority Data

Oct. 30, 2007 (JP) ............................. 2007-282421
Oct. 30, 2007 (JP) ............................. 2007-282424
Dec. 18, 2007 (JP) ............................. 2007-326264

(51) Int. Cl.
*H02K 11/00* (2006.01)
(52) U.S. Cl. ......................................... 310/71; 439/470
(58) Field of Classification Search .................. 310/71, 310/88, 87; 174/668; 439/470, 456, 472, 439/469, 449, 451
See application file for complete search history.

(56) References Cited

U.S. PATENT DOCUMENTS

| | | | | |
|---|---|---|---|---|
| 3,269,322 A | * | 8/1966 | Lotspih | 417/423.3 |
| 4,768,931 A | * | 9/1988 | Iwai et al. | 417/366 |
| 4,802,072 A | * | 1/1989 | Kau | 362/238 |
| 5,089,735 A | * | 2/1992 | Sawaguchi et al. | 310/88 |
| 5,171,155 A | * | 12/1992 | Mendoza | 439/134 |
| 5,352,854 A | * | 10/1994 | Comerci et al. | 174/662 |
| 5,584,567 A | * | 12/1996 | Rumpel | 362/249.08 |
| 6,050,840 A |   | 4/2000 | Kowalski et al. | 439/369 |
| D440,940 S | * | 4/2001 | Huang | D13/134 |
| 6,241,552 B1 | * | 6/2001 | Pan | 439/575 |
| 6,329,735 B1 | * | 12/2001 | Tanaka et al. | 310/239 |
| 2003/0234588 A1 | * | 12/2003 | Machida | 310/71 |
| 2004/0189120 A1 | * | 9/2004 | Takashima et al. | 310/89 |

FOREIGN PATENT DOCUMENTS

| | | |
|---|---|---|
| JP | 6165435 A | 6/1994 |
| JP | 2004297896 A | 10/2004 |

* cited by examiner

*Primary Examiner*—Hae Moon Hyeon
(74) *Attorney, Agent, or Firm*—Orum & Roth LLC

(57) ABSTRACT

In a feeder line drawing structure of a motor for a ship propeller, a guide portion detachably retaining a feeder line drawn out from a grommet in a drawing direction is provided in a lower end side of a housing in accordance with an integral molding, a bracket connected to a lower end of a housing formed as a close-top tube shape.

5 Claims, 6 Drawing Sheets

FEEDER LINE DRAWING STRUCTURE OF MOTOR FOR SHIP PROPELLER

CROSS REFERENCES TO RELATED APPLICATIONS

This application claims priority of Japanese Patent Application 2007-282421, Japanese Patent Application 2007-282424, and Japanese Patent Application 2007-326264.

BACKGROUND OF THE INVENTION

1. Field of the Invention

The present invention relates to a feed wire drawing structure of a motor for a ship propeller which is preferably used in a power trim tilt apparatus such as an outboard motor or the like.

2. Description of the Related Art (A) Conventionally, as described in Japanese Patent Application Laid-Open (JP-A) No. 6-165435 (patent document 1), it is necessary to draw out a feeder line so as to make a protruding amount of the feeder line to a periphery of a motor small in such a manner as to prevent the feeder line drawn out from the motor from generating any interference with a wall of a hull and a movable portion of an outboard motor, when mounting a power trim tilt apparatus of the outboard motor to the hull. Further, it is necessary to prevent water such as sea water or the like from making an intrusion into the drawn portion of the motor.

Accordingly, in the feeder line drawing structure of the motor described in the patent document 1, a bracket is connected to a lower end of a housing formed as a closed-top tube shape. A grommet is inserted and attached to an insertion hole provided in the bracket. The feeder line is drawn to an outer side while passing through the grommet in a direction which is orthogonal to an axis of the housing, and the feeder line bent in a direction which is along the axis of the housing in an outer side of the grommet is extended upward along an outer surface of the housing. Further, a retaining member retaining the feeder line drawn out from the grommet and extending along the outer surface of the housing is pinched between mating faces of the housing and the bracket.

The following problems exist in the patent document 1.

(1) After the feeder line passes through the grommet inserted and attached to the bracket in the direction which is orthogonal to the axis of the housing so as to be drawn out to the outer side, the feeder line is bent in the direction which is along the axis of the housing. Accordingly, there is a risk that the bent feeder line applies its restoration behavior force of a deflection to the grommet so as to deform the grommet, thereby deteriorating a sealing function achieved by the grommet in the drawn portion of the feeder line from the bracket.

(2) It is necessary to use an adhesive agent as a means for inexpensively fixing the grommet to the insertion hole of the bracket, and it is necessary to provide equipment for drying the adhesive agent, so that the structure is complicated.

(3) Further, in order to retain the feeder line extending along the outer surface of the housing, the retaining member serving as a peculiar part is pinched between the mating faces of the housing and the bracket. Accordingly, the number of the parts retaining the feeder line is increased, and it is necessary to attach and detach the retaining member when repeatedly attaching and detaching the feeder line to and from the motor, whereby an assembling and dissembling characteristic of the motor is deteriorated, and an auxiliary retaining member is necessary for maintaining and replacing.

(B) Further, as a conventional motor, as described in JP-A No. 2004-297896 (patent document 2), there is a structure in which a bracket is connected to a lower end of a housing formed as a closed-top tube shape. A magnet is fixed to an inner periphery of the housing, each of both end portions of a rotor arranged on a center axis of the housing is supported to a top surface portion of the housing and the bracket. A commutator is provided close to the bracket in the rotor. A position surrounding the commutator of the bracket is provided with a brush holder holding a brush, and a fixing groove holding a brush lead wire connected to the brush. The brush lead wire is prevented from being librated by oscillation by inserting the brush lead wire to the fixed groove so as to retain, thereby excluding an adverse effect applied to a motor control such as an electric current ripple or the like.

In the motor described in the patent document 2, the brush lead wire is simply inserted into the groove from an opening of the fixed groove so as to be retained, and the fixed groove is open toward the outer side even after the brush lead wire is inserted. Accordingly, there is a risk that the brush lead wire deflects out from the opening of the fixed groove.

SUMMARY OF THE INVENTION

An object of the present invention is to secure a seal function for a feeder line by a grommet inserted and attached to a bracket, in a feeder line drawing structure of a motor for a ship propeller.

The other object of the present invention is to easily fix the grommet inserted and attached to the bracket.

Further, an object of the present invention is to easily retain the feeder line extending along an outer surface of a housing in the feeder line drawing structure of the motor for the ship propeller.

Further, an object of the present invention is to securely retain a brush lead wire, in the motor.

The present invention relates to a feeder line drawing structure of a motor for a ship propeller, comprising: a bracket connected to a lower end of a housing formed as a closed-top tube shape. A grommet is inserted and attached to an installation hole provided in the bracket. The feeder line passes through the grommet in a direction which is orthogonal to an axis of the housing so as to be drawn out to an outer side. The feeder line is bent in a direction extending along the axis of the housing in an outer side of the grommet being extended upward along an outer surface of the housing. A guide portion detachably retaining the feeder line drawn out from the grommet in a drawing direction is provided in a lower end side of the housing in accordance with an integral molding.

The present invention relates to a feeder line drawing structure of a motor for a ship propeller, comprising a bracket connected to a lower end of a housing formed as a closed-top tube shape. A grommet is inserted and attached to an installation hole provided in the bracket. The feeder line passes through the grommet in a direction which is orthogonal to an axis of the housing so as to be drawn out to an outer side. The feeder line is bent in a direction extending along the axis of the housing in an outer side of the grommet being extended upward along an outer surface of the housing. A clamp portion detachably retaining the feeder line extending along the outer surface of the housing is provided on the outer surface of the housing in accordance with an integral molding.

The present invention relates to a motor, comprising a bracket connected to a lower end of a housing formed as a closed-top tube shape. A magnet is fixed to an inner periphery of the housing. Both end portions of a rotor are arranged on a center axis of the housing being respectively supported to a top surface portion of the housing and the bracket. A commutator is provided close to the bracket in the rotor. A brush holder retaining a brush and a fixed groove retaining a brush lead wire connected to the brush is provided at a position surrounding the commutator of the bracket. The housing is provided with a presser portion pressing the brush lead wire retained by the fixed groove so as to prevent the brush lead wire from coming off.

The present invention relates to a motor, comprising a bracket connected to a lower end of a housing formed as a closed-top tube shape. A magnet is fixed to an inner periphery of the housing. Both end portions of a rotor are arranged on a center axis of the housing being respectively supported to a top surface portion of the housing and the bracket. A commutator is provided close to the bracket in the rotor. A brush holder retaining a brush and a fixed groove retaining a brush lead wire connected to the brush is provided at a position surrounding the commutator of the bracket. The brush lead wire is connected to a feeder line via a connector provided in the bracket. A breaker is interposed between a terminal to which the brush lead wire of the connector is connected, and a terminal to which the feeder line is connected is inserted to the bracket. The housing is provided with a presser portion pressing the breaker so as to prevent the breaker from coming off.

BRIEF DESCRIPTION OF THE DRAWINGS

The present invention will be more fully understood from the detailed description given below and from the accompanying drawings which should not be taken to be a limitation on the invention, but are for explanation and understanding only.

FIGS. 7A and 7B show a wiring state of a feeder line to the bracket, in which FIG. 7A is a plan view and FIG. 7B is a side elevational view;

DESCRIPTION OF THE PREFERRED EMBODIMENTS

Figure 1:
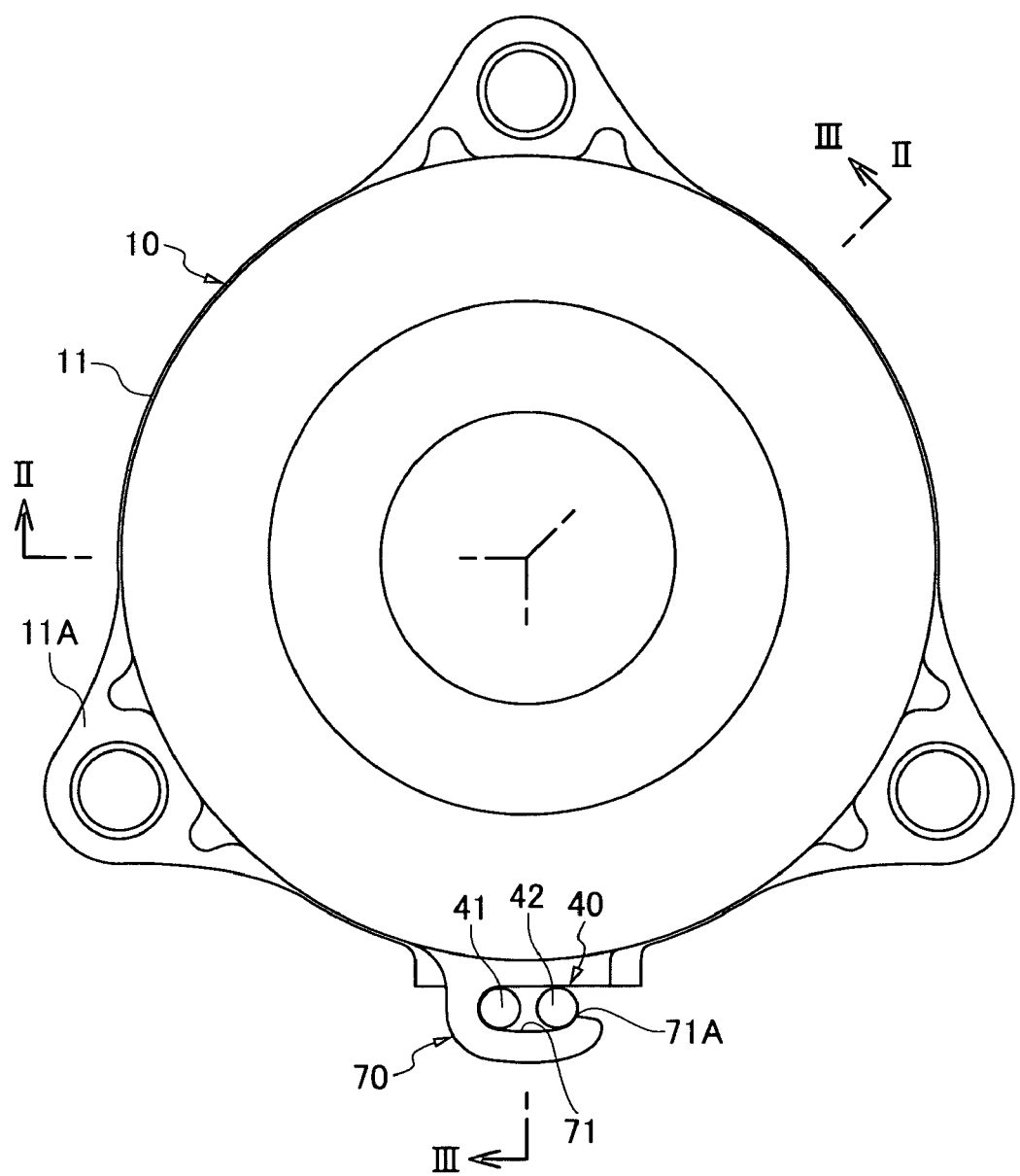
FIG. 1 is a plan view showing a motor.
Figure 2:
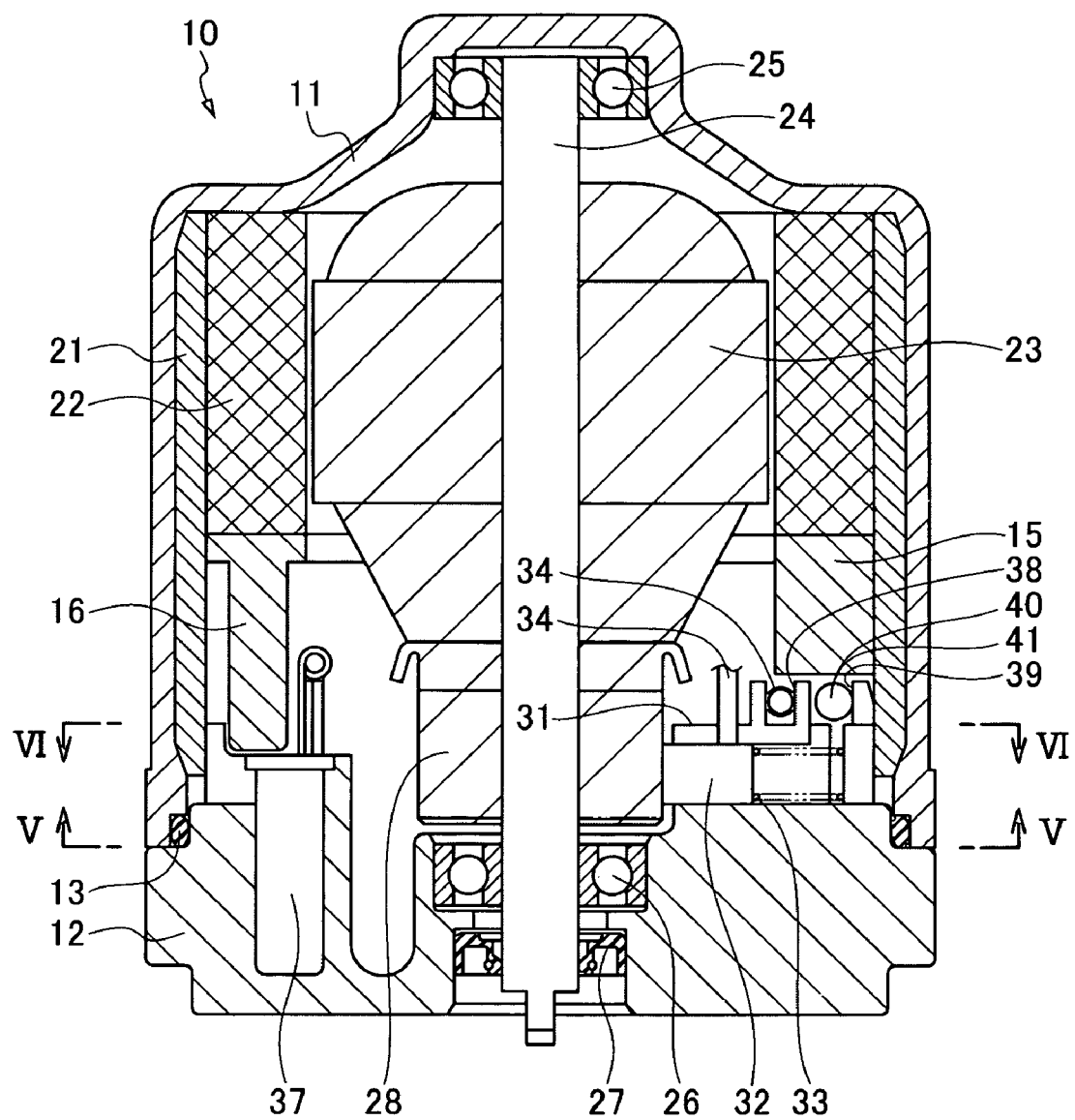
FIG. 2 is a cross sectional view along a line II-II in FIG. 1.

FIGS. 1 to 9 show a direct-current motor 10 driving a hydraulic pump of a power trim tilt apparatus for an outboard motor. The motor 10 is structured by connecting a disc-like synthetic resin bracket 12 to a lower end of a synthetic resin housing 11 formed as a closed-top tube shape, as shown in FIGS. 1 to 4. A flange 11A is provided at a plurality of positions (three positions in the present embodiment) in an outer periphery of a lower and of the housing 11, and a flange 12A opposing to the flange 11A of the housing 11 is provided in an outer periphery of the bracket 12. The motor 10 is structured such that in a state in which a lower end opening portion of the housing 11 is fitted to an upper end outer peripheral portion of the bracket 12 via an O-ring 13, respective flanges 11A and 12A of the housing 11 and the bracket 12 are connected by a stop screw 14 so as to integrate the housing 11 and the bracket 12. The motor 10 is structured such that the bracket 12 is arranged on a support body (not shown) in a state in which the housing 11 and the bracket 12 are integrated, and a bolt inserted to a bolt insertion hole provided in each of the flanges 11A and 12A is screwed.

The motor 10 is fixedly provided with a circular arc-shaped yoke 21 made of a magnetic metal in an inner periphery of a cylinder portion of the housing 11, and circular arc-shaped magnets 22 extending along a plurality of positions (four positions in the present embodiment) in an inner periphery of the yoke 21 are fixedly arranged in an inner periphery of the yoke 21 so as to be spaced from each other.

The motor 10 is structured such that a rotor 23 is arranged on a center axis thereof. One end portion of a rotating shaft 24 of the rotor 23 is supported to a bearing 25 provided in a top surface closed portion of the housing 11, and the other end portion of the rotating shaft 24 is supported to a bearing 26 provided in the bracket 12 and is sealed by a seal member 27. A commutator 28 is provided close to the bracket 12 in the rotor 23.

The motor 10 is provided with brush holders 31 at a plurality of positions (four positions in the present embodiment) in a circumferential direction surrounding the commutator 28 in the bracket 12, and a brush 32 is retained in each of the brush holders 31. Each of the brushes 32 is energized in a radial direction passing through a center of the commutator 28 on the basis of an energizing force of a spring 33 provided in a compression manner with respect to the bracket 12, and is slidably guided by the brush holder 31 so as to come into slidable contact with the commutator 28.

The motor 10 is structured such that a brush lead wire 34 is connected to each of the brushes 32. In the present embodiment, two brush lead wires 34 passing through the center of the commutator 28 and extending from two brushes 32 positioned on a first diameter line in first and second diameter lines which are orthogonal to each other are connected to one terminal 35A of a connector 35, and is connected to a feeder line 40 (41) connected to the other terminal 35B of the connector 35. The other two brush lead wires 34 extending from the other two brushes 32 positioned on the second diameter line are connected to one terminal 36A of a connector 36 with breaker, and is connected to a feeder line 40 (42) connected to the other terminal 36B of the connector 36 (in which a breaker 37 is interposed between the terminal 36A and the terminal 36B).

In this case, the bracket 12 is provided with a fixed groove 38 which inserts and retains an intermediate portion of the longer side brush lead wire 34 in two brush lead wires 34 connected to the connector 35, and an intermediate portion of the longer side brush lead wire 34 in two brush lead wires 34 connected to the connector 36. Further, the brush 12 is provided with a fixed groove 39 inserting and retaining an intermediate portion of the feeder line 40 (41, 42). Further, the housing 11 is provided with the brush lead wire 34 retained to the fixed grooves 38 and 39, a presser protruding portion 15 holding down the feeder line 40 from the above so as to prevent the feeder line 40 from coming off, and a presser protruding portion 16 holding down the breaker 37 inserted to the bracket 12 from the above so as to prevent the breaker 37 from coming off.

A description will be given of a drawing structure of the feeder line 40 (41, 42) in the motor 10. It is necessary to draw out the feeder line 40 from the motor 10 without generating any intrusion of water such as waste water or the like into the inner portion of the motor 10, and it is necessary to make a protruding amount of the drawn feeder line 40 to the periphery of the motor 10 in such a manner as to prevent an interference with a wall of a hull or a movable portion of an outboard motor from being generated.

Figure 3:
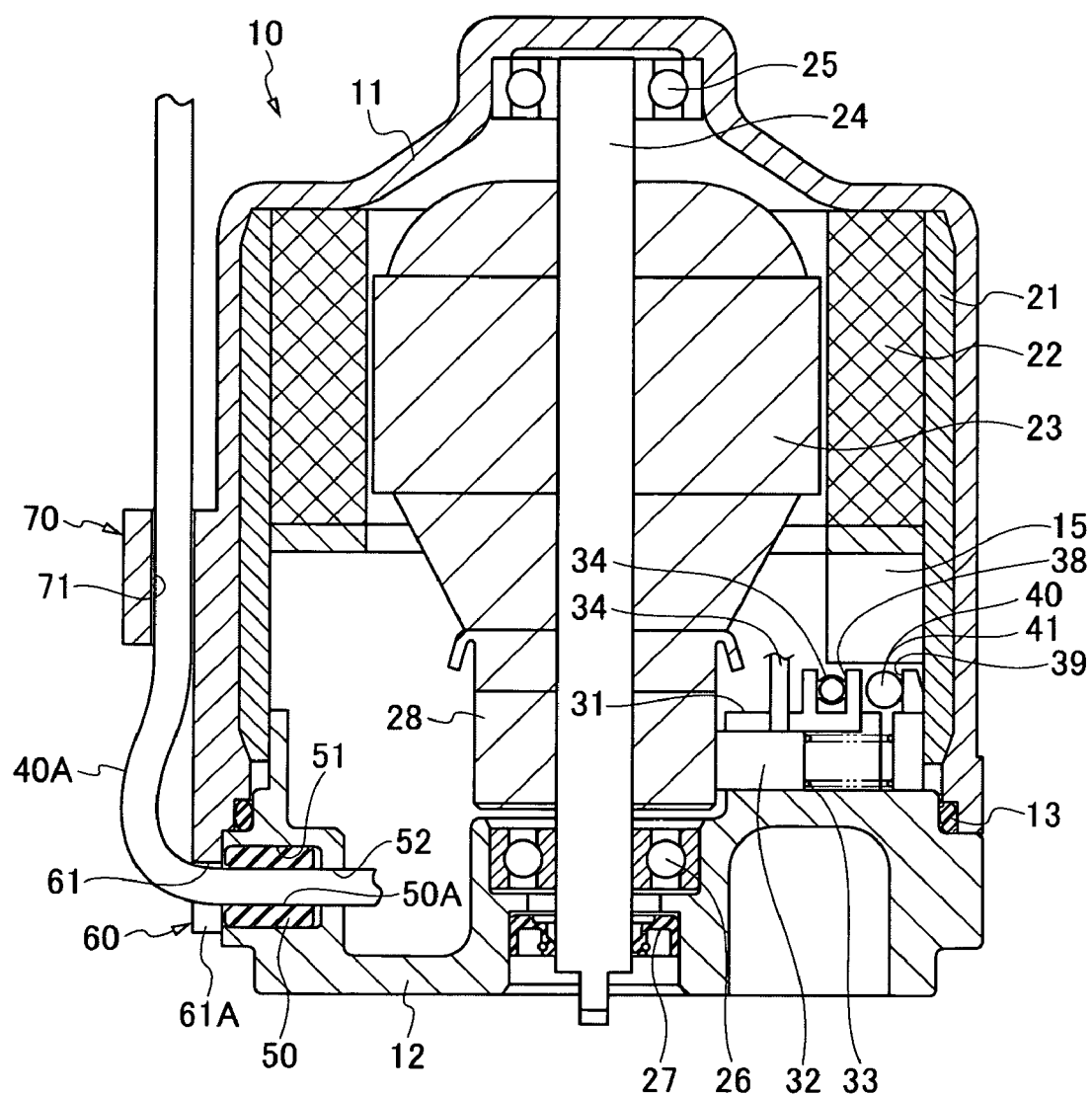
FIG. 3 is a cross sectional view along a line in FIG. 1.
Figure 4:
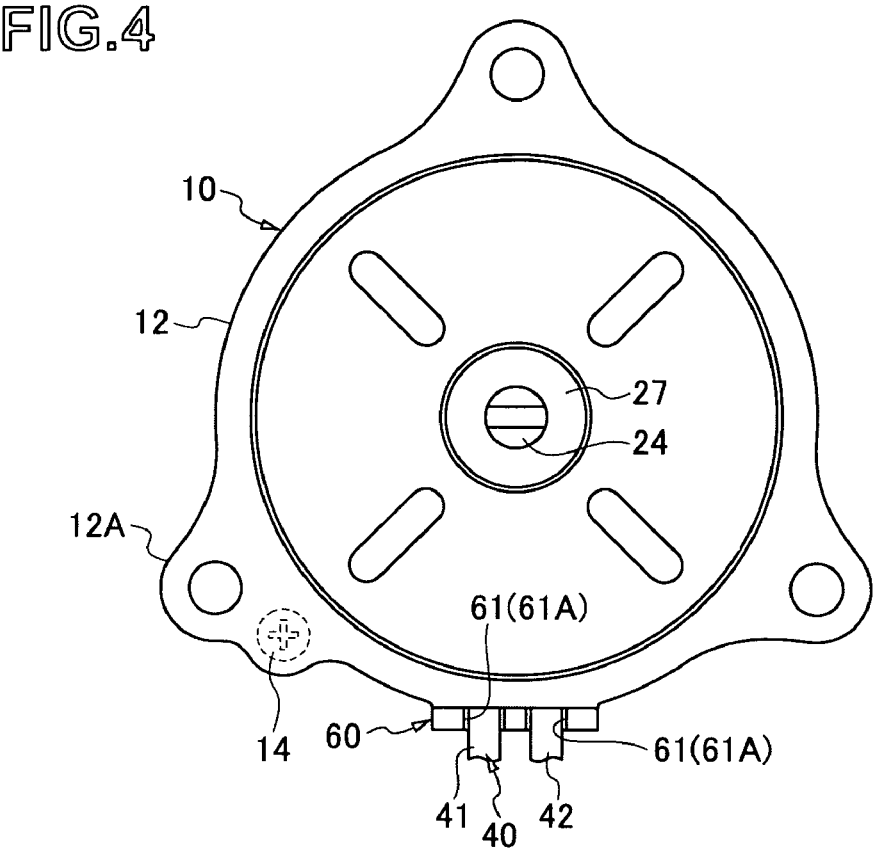
FIG. 4 is a bottom elevational view of a motor.
Figure 5:
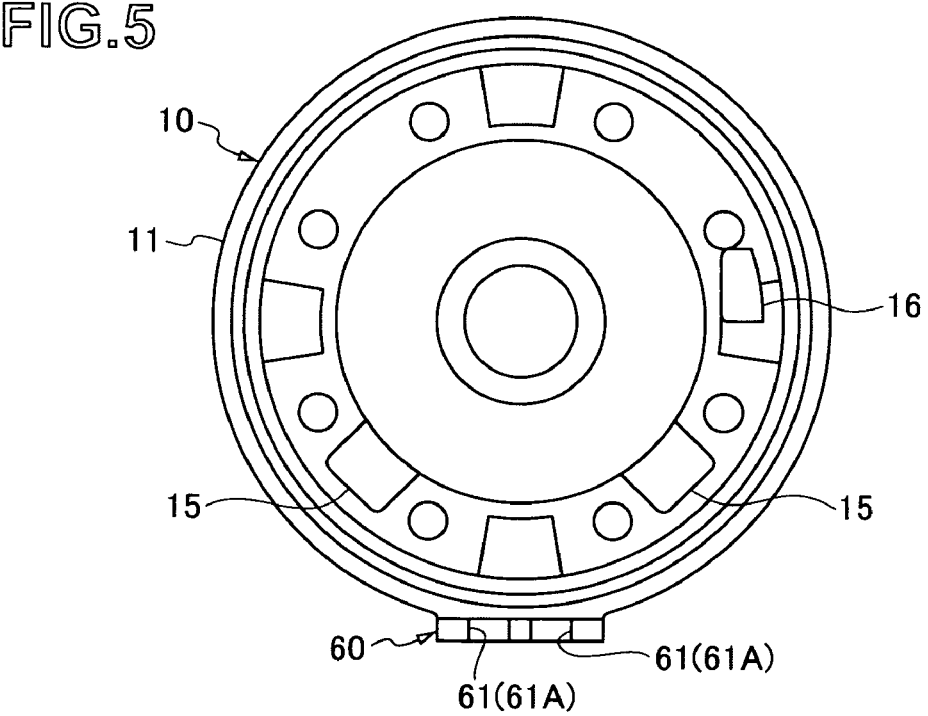
FIG. 5 is a view as seen from an arrow along a line V-V of a housing in FIG. 2.
Figure 6:
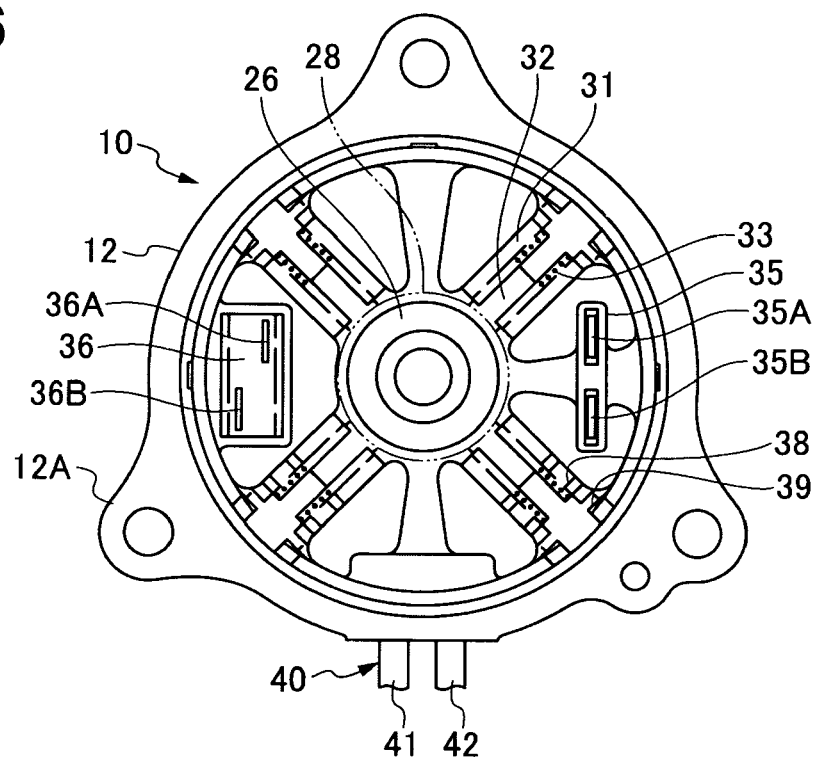
FIG. 6 is a view as seen from an arrow along a line VI-VI of a bracket in FIG. 2.
Figure 7A:
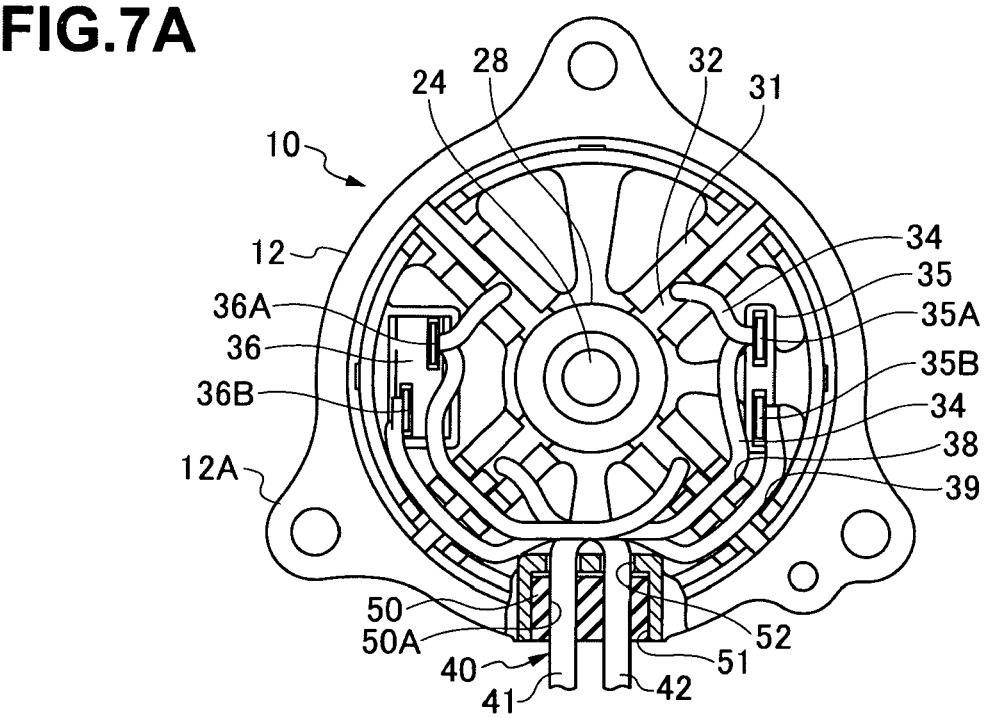
Figure 7B:

The motor 10 is structured such that a grommet 50 is lightly pressure inserted and installed to an installation hole 51 provided in a concave manner in a direction which is orthogonal to the center axis of the housing 11, on an outer surface of the bracket 12. In the present embodiment, as shown in FIGS. 3, 7A and 7B, there is provided the long hole shaped installation hole 51 which is formed as a concave shape with respect to the outer surface of the bracket 12, and an insertion hole 52 passing the feeder line 40 inside and outside the motor 10 is pierced on a hole bottom surface of the installation hole 51. In the present embodiment, there are pieced two insertion holes 52 and 52 in correspondence to two feeder lines 41 and 42. In the present embodiment, the grommet 50 is installed to the installation hole 51 via no sealing agent. In another embodiment it may be installed via the sealing agent.

The feeder line 40 (41, 42) passes through a sealed hole 50A provided in a direction which is orthogonal to the center axis of the housing 11 of the grommet 50, two sealed holes 50A and 50A corresponding to two feeder lines 41 and 42 in the present embodiment, and is drawn out from the inner portion of the motor 10 to an outer side. The feeder line 40 (41, 42) drawn out from the motor 10 is bent in a direction extending along the center axis of the housing 11 (a direction toward a top surface side of the housing 11) by an outside bent portion 40A getting out of the sealed hole 50A of the grommet 50, and is extended upward toward the top surface side along the outer surface of the housing 11.

At this time, as shown in FIGS. 3, 4, 8 and 9, the motor 10 is provided with a guide portion 61 detachably retaining the feeder line 40 (41, 42) drawn out from the grommet 50 inserted and attached to the installation hole 51 of the bracket 12 in a drawing out direction just before the bent portion 40A bending in a direction extending along the center axis of the housing 11, in a lower end side of the housing 11 in accordance with an integral molding.

Specifically, there is provided a rectangular plate shaped downward protruding portion 60 protruding to a side of the grommet 50 inserted and attached to the installation hole 51 of the bracket 12, from an intermediate portion to a lower end portion along the axial direction, in a part in a circumferential direction of the outer surface of the cylinder portion of the housing 11. And, there is provided a guide portion 61 having a downward opening portion 61A which is formed as a groove shape and is open downward in the protruding portion 60, two stripes of guide portions 61 and 61 corresponding to two feeder lines 41 and 42 in the present embodiment. When fitting the housing 11 to the bracket 12, each of the guide portions 61 corresponds to each of the sealed holes 50A of the grommet 50, and a groove upper end of each of the guide portions 61 is formed as a circular arc shape coinciding with the upper circular arc of each of the sealed holes 50A. Accordingly, the feeder line 40 (41, 42) drawn out from the grommet 50 is straightly retained in a drawing direction at a thickness of the protruding portion 60, and is not deformed even if it is exposed to a restoration behavior force of a deflection generated by the bent portion 40A.

Figure 8:
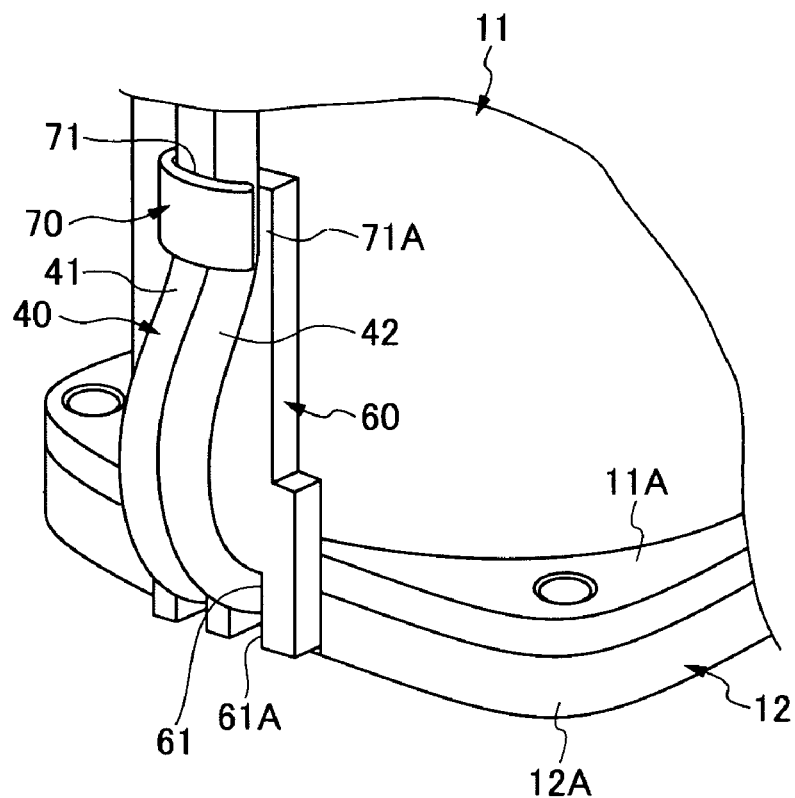
FIG. 8 is a perspective view showing a drawing structure of a feeder line.
Figure 9:
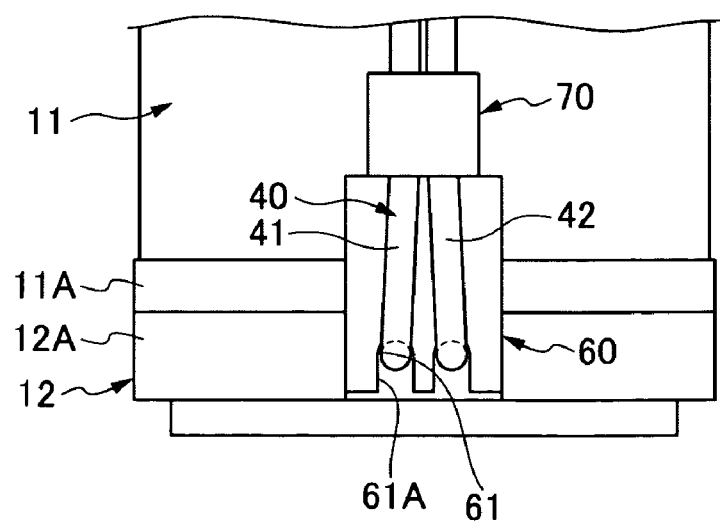
FIG. 9 is a side elevational view showing the drawing structure of the feeder line.

The protruding portion 60 covers the outer end surface of the grommet 50 so as to close, and prevents the grommet 50 from coming off from the installation hole 51. In the present embodiment, the outer surface around the installation hole 51 of the bracket 12 provided in a concave manner with the installation hole 51 of the grommet 50 processed as a flat surface shape (FIGS. 7A and 7B). Further, a plate-shaped protruding portion 60 protruding downward from a part in a circumferential direction of an annular lower end portion of the housing 11 fitted to an upper end outer peripheral portion of the bracket 12 is suspended down to a range facing to the outer surface around the installation hole 51 of the bracket 12. An inner surface of the protruding portion 60 facing to the outer surface around the installation hole 51 of the bracket 12 is processed as a flat surface shape which comes into contact with the outer surface around the installation hole 51 (FIGS. 3 and 8). Accordingly, the protruding portion 60 covers so as to close approximately a whole surface of the outer end surface of the grommet 50 inserted and attached to the installation hole 51 of the bracket 12, and prevents the grommet 50 from coming off from the installation hole 51.

In accordance with the present embodiment, since the housing 11 is provided with the protruding portion 60 and the guide portion 61 thereof, the following operations and effects can be achieved.

(a) When the feeder line 40 (41, 42) is bent in the direction extending along the axis of the housing 11 after passing through the grommet 50 inserted and attached to the bracket 12 in the direction which is orthogonal to the axis of the housing 11 so as to be drawn out to the outer side, the guide portion 61 integrally formed in the lower end side of the housing 11 retains the feeder line 40 (41, 42) drawn out from the grommet 50 in the drawing direction just before the bent portion 40A. Accordingly, the bent feeder line 40 (41, 42) is retained by the guide portion 61 and does not deform the grommet 50, whereby it is possible to secure the sealing function of the drawn-out portion from the bracket 12 of the feeder line 40 (41, 42) by the grommet 50.

(b) The lower end portion of the housing 11 has the downward protruding portion 60 protruding to the side of the grommet 50, and the protruding portion 60 is provided with the guide portion 61 which is formed as the groove shape and is open downward. Accordingly, at a time of attaching and detaching the bracket 12 to and from the lower end of the housing 11, the groove-shaped guide portion 61 provided in the downward protruding portion 60 of the housing 11 can be attached to and detached from the feeder line 40 (41, 42) drawn out from the grommet 50 from the above.

(c) The protruding portion 60 in the item (b) mentioned above covers the outer end surface of the grommet 50, and prevents the grommet 50 from coming off from the installation hole 51. Accordingly, at a time of attaching and detaching the bracket 12 to and from the lower end of the housing 11, it is possible to cover the outer end surface of the grommet 50 by the protruding portion 60 of the housing 11, and it is possible to immediately prevent the grommet 50 from coming off so as to easily fix the grommet 50.

Further, as shown in FIGS. 1, 3, 8 and 9, the motor 10 is provided with a clamp portion 71 detachably retaining the feeder line 40 (41, 42) which is drawn out from the grommet 50 inserted and attached to the installation hole 51 of the bracket 12, which is bent by the bent portion 40A in the direction extending along the center axis of the housing 11, and which thereafter extends upward along the outer surface of the housing 11, in an upward extending direction of the feeder line, on the outer surface of the housing 11 in accordance with an integral molding.

Specifically, there is provided a hook portion 70 protruding out to an intermediate portion, an upper end portion of the protruding portion 60 mentioned above in the present embodiment, extending along the axial direction of the outer surface of the cylinder portion of the housing 11. The hook portion 70 is provided the clamp portion 71 having a lateral opening portion 71A which is open to a circumferential direction of the outer surface of the housing 11 while being formed as a groove shape. The feeder line 40 (41, 42) is inserted to the clamp portion 71 from the lateral opening portion 71A of the hook portion 70. In the present embodiment, two feeder lines 41 and 42 are retained in parallel between the hook portion 70 and the outer surface of the housing 11, the surface of the upper end portion of the protruding portion 60 in the present embodiment.

In accordance with the present embodiment, since the housing 11 is provided with the hook portion 70 and the clamp portion 71, the following operations and effects can be achieved.

(a) The feeder line 40 (41, 42) extending upward along the outer surface of the housing 11 is detachably retained to the clamp portion 71 which is integrally formed on the outer surface of the housing 11. Since the clamp portion 71 is integrally formed in the housing 11, the number of parts is not increased. The assembling and dissembling characteristic of the motor 10 is improved at a time of repeatedly attaching and detaching the feeder line 40 (41, 42) to and from the motor 10, and any auxiliary part for maintaining and replacing is not necessary.

(b) The hook portion 70 is provided on the outer surface of the housing 11, and the hook portion 70 is provided with the clamp portion 71 which is formed as the groove shape and is open to the circumferential direction of the housing 11. Accordingly, it is possible to easily lock the feeder line 40 (41, 42) extending to the outer surface of the housing 11 into the groove-shaped clamp portion 71 of the hook portion 70 from the circumferential direction of the housing 11 so as to be attached and detached.

In accordance with the present embodiment, since the housing 11 is provided with the brush lead wire 34, the presser protruding portion 15 for the feeder line 40, and the presser protruding portion 16 for the breaker 37, the following operations and effects can be achieved.

(a) The brush lead wire 34 is inserted and retained to the fixed groove 38 provided in the bracket 12, and is thereafter pressed from the above by the presser protruding portion 15 provided in the housing 11 so as to be prevented from coming off. The presser protruding portion 15 of the housing 11 approximately closes the opening of the fixed groove 38 of the bracket 12 from the above, and securely avoids a possibility that the brush lead wire 34 deflects out from the opening of the fixed groove 38.

(b) The come-off preventing structure of the brush lead wire 34 in the item (a) mentioned above can be immediately constructed by connecting the bracket 12 to the lower end of the housing 11.

(c) The feeder line 40 connected to the brush lead wire 34 via the connectors 35 and 36 is also pressed from the above by the presser protruding portion 15 provided in the housing 11 so as to be prevented from coming off, after being inserted and retained to the fixed groove 39 provided in the bracket 12. The presser protruding portion 15 of the housing 11 approximately closes the opening of the fixed groove 39 of the bracket 12 from the above, and securely avoids the possibility that the feeder line 40 deflects out from the opening of the fixed groove 39.

(d) The come-off preventing structure of the feeder line 40 in the item (c) mentioned above can be immediately constructed by connecting the bracket 12 to the lower end of the housing 11.

(e) The breaker 37 is pressed from the above by the presser protruding portion 16 provided in the housing 11 so as to be prevented from coming off, after being inserted to the bracket 12. It is possible to securely prevent the breaker from coming off, while making the inserting characteristic of the breaker 37 to the bracket 12 easy.

(f) The come-off preventing structure of the breaker in the item (e) mentioned above can be immediately constructed by connecting the bracket 12 to the lower end of the housing 11.

As heretofore explained, embodiments of the present invention have been described in detail with reference to the drawings. However, the specific configurations of the present invention are not limited to the embodiments but those having a modification of the design within the range of the present invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. A feeder line drawing structure of a motor for a ship propeller, comprising:
    a bracket connected to a lower end of a housing of the motor formed as a closed-top tube shape;
    a grommet inserted and attached to an installation hole provided in the bracket;
    a feeder line passing through the grommet in a direction which is orthogonal to an axis of the housing so as to be drawn out to an outer side of the housing; and
    the feeder line being bent in a direction along the axis of the housing in an outer side of the grommet and being extended upward along an outer surface of the housing,
    wherein a guide portion detachably retaining the feeder line drawn out from the grommet in a drawing direction is provided in a lower end side of the housing external to the housing in accordance with an integral molding.

2. The feeder line drawing structure of a motor for a ship propeller according to claim 1, the lower end portion of said housing being provided with a downward protruding portion protruding to a side of said grommet, and
    wherein said guide portion which is formed as a groove shape and is open downward is provided in said protruding portion.

3. The feeder line drawing structure of a motor for a ship propeller according to claim 2, wherein said protruding portion covers an outer end surface of said grommet, and prevents said grommet from coming off from said installation hole.

4. A feeder line drawing structure of a motor for a ship propeller, comprising:
- a bracket connected to a lower end of a housing of the motor formed as a closed-top tube shape;
- a grommet inserted and attached to an installation hole provided in the bracket;
- a feeder line passing through the grommet in a direction which is orthogonal to an axis of the housing so as to be drawn out to an outer side of the housing; and
- the feeder line being bent in a direction along the axis of the housing in an outer side of the grommet and being extended upward along an outer surface of the housing,
- wherein a clamp portion detachably retaining the feeder line extending along the outer surface of the housing against the housing in a direction orthogonal to the direction of the feeder line passing through the grommet is provided on the outer surface of the housing in accordance with an integral molding.

5. The feeder line drawing structure of a motor for a ship propeller according to claim 4, a hook portion being provided on the outer surface of said housing, and
- wherein said hook portion is provided with said clamp portion which is formed as a groove shape and is open to a circumferential direction of said housing.

* * * * *